United States Patent [19]
Golden

[11] Patent Number: 5,937,018
[45] Date of Patent: Aug. 10, 1999

[54] DC OFFSET COMPENSATION USING ANTENNA ARRAYS

[75] Inventor: Glenn David Golden, Boulder County, Colo.

[73] Assignee: Lucent Technologies Inc., Murray Hill, N.J.

[21] Appl. No.: 08/865,566

[22] Filed: May 29, 1997

[51] Int. Cl.[6] .................................................. H04L 1/02
[52] U.S. Cl. ............................................................ 375/347
[58] Field of Search .................................... 375/346, 347, 375/267; 370/321, 334, 337, 347; 343/844, 725; 455/132, 137, 272, 273, 269, 278.1, 283, 296

[56] References Cited

U.S. PATENT DOCUMENTS

| | | | |
|---|---|---|---|
| 4,281,411 | 7/1981 | Bonn et al. | 375/232 |
| 4,286,268 | 8/1981 | Daniel et al. | 342/379 |
| 5,473,333 | 12/1995 | Chiba et al. | 342/378 |
| 5,819,168 | 10/1998 | Golden et al. | 455/303 |
| 5,875,216 | 2/1999 | Martin | 375/347 |

OTHER PUBLICATIONS

Winters, Jack H. et al. "The Impact of Antenna Diversity on the Capacity of Wireless Communication Systems", IEEE Transactions on Communications vol. 42, No. 2/3/4, Feb./Mar./Apr.1994.

Winters, Jack H., "Signal Acquisition and Tracking with Adaptive Arrays in the Digital Mobile Radio System IS–54 with Flat Fading"; IEEE Transactions on Vehicular Technology, vol. 42, No. 4, Nov.1993.

*Primary Examiner*—Don N. Vo
*Assistant Examiner*—Albert Park

[57] ABSTRACT

An apparatus for performance improvement of a digital wireless receiver comprises a processing circuit for processing a plurality of received signals and providing a processed signal, wherein each of the plurality of received signals is weighted and combined to provide the processed signal; and a generation circuit for computing a weight vector. The weight vector has a number of weights greater than the plurality of received signals and is computed as a least-squares problem solution.

19 Claims, 1 Drawing Sheet

DC OFFSET COMPENSATION USING ANTENNA ARRAYS

CROSS REFERENCES TO RELATED APPLICATIONS

This application is related to copending U.S. Pat. application Ser. No. 08/850,132, entitled "Time Varying Weight Estimation" filed on May 1, 1997, copending U.S. Pat. application Ser. No. 08/848,945, entitled "Subspace Method For Adaptive Array Weight Tracking" filed on May 1, 1997, copending U.S. Pat. application Ser. No. 08/848,946, U.S. Pat. No. 5,875,216, entitled "Weight Generating in Stationary Interference And Noise Environments" filed on May 1, 1997, copending U.S. Pat. application Ser. No.08/847,956, U.S. Pat. No. 5,887,038, entitled "Adaptive Antenna Array Processing Arrangement Using A Combined Coherent And Constant-Modulus Reference Signal" filed on Apr. 22, 1997, copending U.S. Pat. application Ser. No. 08/756,293, entitled "Artificial Fading for Frequency Offset Mitigation" filed on Nov. 25, 1996, copending U.S. Pat. application Ser. No. 08/716,659, entitled "Joint Timing, Frequency And Weight Acquisition For an Adaptive Array" filed on Sep. 6, 1996, copending U.S. Pat. application Ser. No. 08/606,777, entitled "Introducing Processing Delay As A Multiple Of The Time Slot Duration" filed on Feb. 27, 1996 and copending U.S. Pat. application No. 08/695,492, entitled "Output Signal Modification For Soft Decision Decoding" filed on Aug. 12, 1996.

FIELD OF THE INVENTION

The present invention relates to the field of wireless communication and more particularly to digital wireless communication systems.

BACKGROUND OF THE INVENTION

In wireless communication systems, the use of antenna arrays at the base station has been shown to increase both range, through increased gain, and capacity, through interference suppression. With adaptive antenna arrays, the signals received by multiple antenna elements are weighted and combined to improve system performance, e.g., by maximizing the desired receive signal power and/or suppressing interference. The performance of an adaptive antenna array increases dramatically with the number of antennas. Referring to an article entitled, "The Impact of Antenna Diversity on the Capacity of Wireless Communication Systems," by J. H. Winters, R. D. Gitlin and J. Salz, in IEEE Trans. on Communications, April 1994, it is shown that using an M element antenna array with optimum combining of the received signals can eliminate $N \leq M-1$ interferers and achieve an M-N fold diversity gain against multipath fading; ⁻resulting in increased range.

Most base stations today, however, utilize only two receive antennas with suboptimum processing, e.g., selection diversity where the antenna having the larger signal power is selected for reception and processing. It is desirable to be able to modify existing base stations to accommodate larger arrays of antennas and/or improved received signal combining techniques. However, modifying existing equipment is difficult, time consuming, and costly, in particular since equipment currently in the field is from a variety of vendors.

One alternative is to utilize an applique, which is an outboard signal processing box, interposed between the current base antennas and the input to the base station, which adaptively weights and combines the received signals fed to the base station, optionally utilizing additional antennas. FIG. 1 shows a base station utilizing an applique. A key to the viability of utilizing the applique approach is that it should require little, if any, modification of the base station equipment. This constraint implies that the processing performed by the applique must be transparent to the existing equipment. Ideally, the signal emerging from the applique should appear to the existing base station as a high-quality received signal from a single antenna.

In practice, the received signals from the antennas are typically downconverted from radio frequency (RF) to baseband for subsequent processing by the adaptive array. Due to various implementation-related effects, especially when homodyne receivers are used, it is common for the resultant baseband signals to contain small undesirable DC or near-DC components. When the power of the undesirable DC or near DC components is comparable to the system noise power, the performance of the system is significantly degraded if the DC or near DC components are left uncompensated.

In an adaptive array system, limited DC compensation is available through the normal process of adaptive combining. Although DC offset is typically an artifact of the receiving process, it is equivalent to an additive carrier frequency interferer in the incoming passband signal. Therefore, the DC offset is amenable to cancellation like any other additive interferer.

However any additive interferer present in the input signal represents a constraint on the degrees of freedom available to the array, reducing the capability of the system to minimize the mean-squared error (MSE) such as by mitigating other interferers and noise. If the power of the DC offset is comparable to the system noise floor, then the effective size of the antenna array is reduced by one element, and its performance against fading and noise can be significantly reduced. This is a particularly severe problem when the number of antenna array elements is small and the loss of one element is significant.

A traditional way to compensate for DC offset is to estimate the DC component in each baseband signal and to subtract the DC estimate before the adaptive combining operation, thus providing the remainder of the receiver with a substantially DC free input signal. Unfortunately, the DC offset is not pure DC. The DC offset may be time varying, which can be rather rapid, thus the estimate would have to be made over a suitably small time scale. This DC estimation is not so straightforward because the desired signal component of the input signal itself contains short term DC components, much larger than the DC offset, which can swamp any DC estimate that is made over a relatively short time interval. Thus, applying the traditional DC compensation method can result in the introduction of a significant DC offset in a signal that had a relatively small or no DC offset.

Therefore, there is a need to provide DC compensation without loss of degrees of freedom and with minimal sensitivity to the DC component in the input signal.

SUMMARY OF THE INVENTION

In accordance with the present invention, there is provided an apparatus for performance improvement of a digital wireless receiver. The apparatus comprises a processing circuit for processing a plurality of received signals and providing a processed signal, wherein each of the plurality of received signals is weighted and combined to provide the processed signal; and a generation circuit for computing a weight vector. The weight vector has a number of weights greater than the plurality of received signals and is computed by solving a least-squares problem.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Figure 1:
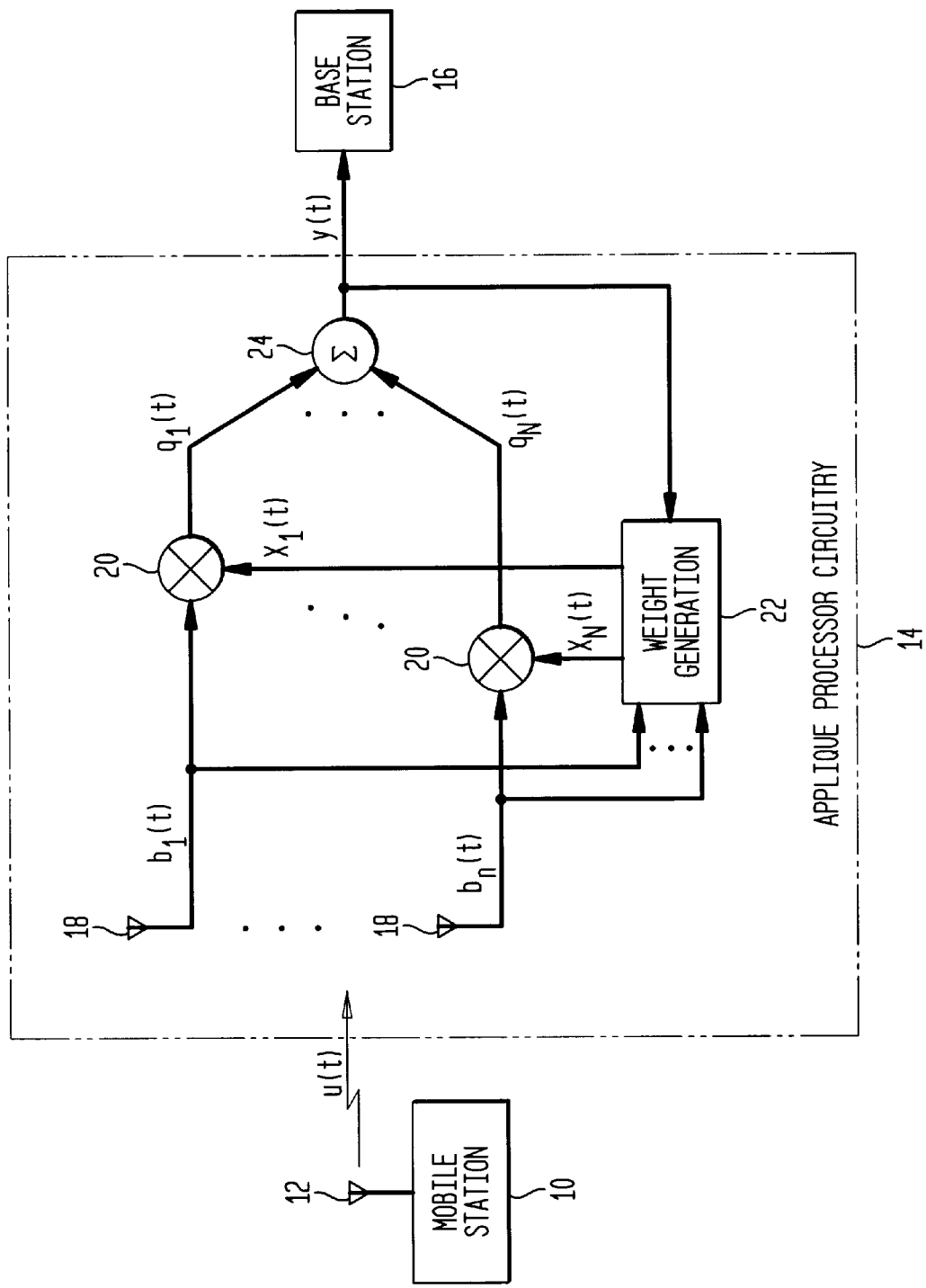
FIG. 1 is a block diagram of an adaptive array using multiple antennas.

Although the present invention is particularly well suited for use in TDMA mobile radio systems, such as North American Digital Mobile Radio Standard IS-136, and shall be described with respect to this application, the methods and apparatus disclosed here can be applied to other digital wireless communication systems. Other systems include but are not limited to the Groupe Speciale Mobile (GSM) based system, also known as Global System for Mobile Communications, which is a standard digital cellular phone service used in Europe and Japan, and the Digital European Cordless Telecommunications (DECT) based system, which is a pan-European digital cordless telephony interface specification. Although the present invention is particularly well suited for use with an applique and shall be described with respect to this application, the methods and apparatus disclosed here can be is equally well suited for an integrated solution for adaptive arrays in a base station.

Referring to FIG. 1 there is shown a block diagram of a type of signal processing used in a base station applique. A signal u(t) transmitted by a mobile station 10 through a mobile antenna 12 is received by a base station 16 from N antennas 18, with received baseband signals $b_1(t)$ to $b_N(t)$, respectively. At the applique processor circuitry 14, the received baseband signals $b_1(t)$ to $b_N(t)$ are weighted using multipliers 20 having weights $x_1(t)$ to $x_N(t)$, respectively, to generate corresponding weighted signals $q_1(t)$ to $q_N(t)$. The weighted signals $q_1(t)$ to $q_N(t)$ are then combined using summer 24 to generate an output signal y(t) which is then provided to the base station equipment. Weights $x_1(t)$ to $x_N(t)$ are generated by weight generation circuitry 22 using the received baseband signals $b_1(t)$ to $b_N(t)$ and output signal y(t).

With the correct symbol timing and carrier frequency, the weights can be generated to combine the signals received from multiple antennas to increase gain and suppress interference, permitting operation even with noise and/or interference power that is greater than the signal power.

In an adaptive array system where the weight computation is intended to track Rayleigh fading, the weight vector $x^{N \times 1}$ is typically computed as the solution to the least-squares problem $$\min_x \|Ax - b\|^2. \qquad \text{Equation 1}$$

where $A^{M \times N}$ is the channel sample matrix, $b^{M \times 1}$ is the transmitted data symbol sequence, or an estimate of the transmitted data symbol sequence, M is the number of training samples, and N is the number of weights. The ij-th entry of A is the i-th sample from the j-th antenna of the array.

In order to modify the array computation to provide DC compensation, an augmented array $\bar{A}$ is defined by appending an additional column to the matrix A The augmented array $\bar{A}$ is $$\bar{A}^{M \times (N+1)} \equiv [A \; d] \qquad \text{Equation 2}$$

where $d^{M \times 1} \equiv (d, d, d, \ldots, d)^T$, and d is a suitably chosen small complex constant, and an additional corresponding weight is introduced into the weight vector x, where $\bar{x}_{(N+1) \times 1} \equiv (x_1, x_2, \ldots x_N, x_{N+1})^T$. The optimum weight calculation for the augmented system $(\bar{A}, \bar{x})$ is exactly the same as Equation 1, except that the corresponding least-squares problem is now Mx(N+1).

This is equivalent to adding an additional antenna to the array which in effect receives a signal comprised of DC alone, with no noise, no desired signal and no other interferers. With the assumption that the DC component is not time varying, then the weight computation performed on the augmented system $(\bar{A}, \bar{x})$ yields a weight vector $\bar{x}_{opt}$ which results in complete cancellation of the DC component in the output signal, achieving the same MSE as the DC-free system.

Essentially the same technique can be applied in the more general case of any interferer(s) whose behavior can be modeled as a complex scalar multiple of some signals $\rho_1(t)$, $\rho_2(t)$, ... which are known a priori at the receiver. The augmented matrix $\bar{A}$ for the general case is formed by concatenating column vectors of T-spaced samples of the known processes, i.e. $p_1 = (\rho_1(kT), \rho_1((k-1)T), \ldots)^T$, etc., to the original A matrix.

The method is theoretically optimal assuming a single DC interferer. This can be extended in an obvious way to the general case of multiple interferers.

Consider the non-augmented system when no DC is present, and denote the optimum weight vector for this case as $x_{opt}$. The output of the array at the k-th symbol time is $$y_{opt} = \sum_{n=1}^{N} x_{opt,n}(s_n + i_n + \varepsilon_n). \qquad \text{Equation 3}$$

where $S_n$, $i_n$, and $\varepsilon_n$ are respectively the desired signal, interferer, and noise components of the input signal from the n-th antenna. The contribution of the MSE at this symbol is $|r_{opt}|^2$, where the error $r_{opt}$ is defined as $$r_{opt} \equiv y_{opt} - \hat{a} \qquad \text{Equation 4}$$

and â is an estimate of the k-th transmitted symbol.

Still considering the non-augmented system, suppose that DC is present but that the no-DC optimum weight vector $x_{opt}$ is utilized. The array output $\tilde{y}$ in this case is $$\tilde{y} = \sum_n x_{opt,n}(s_n + i_n + \varepsilon_n + d_n). \qquad \text{Equation 5a}$$

$$= \sum x_{opt,n}(s_n + i_n + \varepsilon_n) + \sum x_{opt,n} d_n). \qquad \text{Equation 5b}$$

$$= y_{opt} + \sum x_{opt,n} d_n. \qquad \text{Equation 5c}$$

where $d_n$ is the DC component on the n-th receiver output signal, and the corresponding error $\tilde{r}$ is $$\tilde{r} = \tilde{y} - \hat{a}_n. \qquad \text{Equation 6a}$$

$$= (y_{opt} - \hat{a}_n) + \sum x_{opt,n} d_n. \qquad \text{Equation 6b}$$

$$= r_{opt} + \sum x_{opt,n} d_n. \qquad \text{Equation 6c}$$

Consider the augmented system when DC is present. If the DC is assumed to not be time varying, then from the definitions of $\overline{A}$, $\overline{x}$ and Equation 6c it can be seen that there exists a weight vector $\overline{x}_0$ such that the corresponding error $\overline{r}_0 = r_{opt}$. This weight vector is $$\overline{x}_0 = \begin{bmatrix} x_{opt} \\ -\dfrac{\sum x_{opt,n} d_n}{d} \end{bmatrix}. \qquad \text{Equation 7}$$

Therefore, in the presence of DC, $\overline{x}_0$ achieves the same MSE as does $x_{opt}$ when there is no DC present. As it is not possible to do better, this implies that $\overline{x}_{opt} = \overline{x}_0$, and that the method is therefore optimum under the assumption. It should further be noted that the DC content of the transmitted baseband (i.e. b) is not involved in the illustration, thus the technique works equally well for any sequence of transmitted symbols, even one with an arbitrarily large DC component, such as with many repetitions of the same symbol.

The method is only approximately optimal if the spectrum DC artifacts introduced by the receiver are of non-zero bandwidth, rather than a true spectral line. If the (reciprocal) time span of the columns of $\overline{A}$ is small compared to the "DC" bandwidth, then the degradation from optimality is correspondingly small. When the DC spectral components are approximately an order of magnitude smaller in bandwidth than the reciprocal time span of $\overline{A}$, the method has been confirmed to work very effectively.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed is:

1. An apparatus for performance improvement of a digital wireless receiver comprising:
    a process circuit for processing a plurality of received signals and providing a processed signal, wherein each of said plurality of received signals is weighed and combined to provide said processed signal; and
    a generation circuit for computing a weight vector such that said weight vector has a number of weights greater than said plurality of received signals;
    wherein said weight vector is computed as a least-squares problem solution with a channel sample matrix augmented by an additional column, said additional column comprising a small complex constant.

2. The apparatus as recited in claim 1 wherein said weight vector is computed with a channel sample matrix augmented by additional columns comprising symbol-spaced samples of complex scalar multiples of signals known a priori.

3. The apparatus as recited in claim 1 wherein said weight vector tracks a Rayleigh fading profile.

4. The apparatus as recited in claim 1 wherein said plurality of received signals comprise TDMA mobile radio signals.

5. The apparatus as recited in claim 4 wherein said TDMA mobile radio signals comprise IS-136 based mobile radio signals.

6. The apparatus as recited in claim 1 wherein said processing circuit comprises a digital signal processor.

7. The apparatus as recited in claim I wherein said generation circuit comprises a digital signal processor.

8. A method for performance improvement of a digital wireless receiver comprising the steps of
    processing a plurality of received signals;
    computing a weight vector such that said weight vector has a number of weights greater than said plurality of received signals wherein said weight vector is computed as a least-squares problem solution with a channel sample matrix augmented by an additional column, said additional column comprising a small complex constant; and,
    weighting and combining each of said received signals to provide a processed signal.

9. The method as recited in claim 8 wherein said weight vector is computed with a channel sample matrix augmented by additional columns comprising symbol-spaced samples of complex scalar multiples of signals known a priori.

10. The method as recited in claim 8 wherein said weight vector tracks a Rayleigh fading profile.

11. The method as recited in claim 8 wherein said plurality of received signals comprise TDMA mobile radio signals.

12. The method as recited in claim 11 wherein said TDMA mobile radio signals comprise IS-136 based mobile radio signals.

13. The method as recited in claim 8 wherein the step of processing a plurality of received signals utilizes a digital signal processor.

14. A signal processor for a wireless receiver comprising:
    a weight generation circuit for generating a plurality of weights, and
    apparatus for combining a plurality of received signals with the weight values to provide a processed signal as a substitute for an original received signal,
    wherein the plurality of weights is greater than the plurality of received signals and the plurality of weights are computed with a channel sample matrix augmented by an additional column said additional column comprising a small complex constant.

15. The signal processor as recited in claim 14 wherein the plurality of weights are computed as a least-squares problem solution.

16. The signal processor as recited in claim 14 wherein the plurality of weights are computed with a channel sample matrix augmented by additional columns comprising symbol-spaced samples of complex scalar multiples of signals known a priori.

17. The signal processor as recited in claim 14 wherein the plurality of weights tracks a Rayleigh fading profile.

18. The signal processor as recited in claim 14 wherein the plurality of received signals comprise TDMA mobile radio signals.

19. The signal processor as recited in claim 18 wherein the TDMA mobile radio signals comprise IS-136 based mobile radio signals.

* * * * *